United States Patent [19]

Baumann et al.

[11] Patent Number: 4,511,506
[45] Date of Patent: Apr. 16, 1985

[54] REACTIVE BIS-TRIAZINYL STILBENE DYES

[75] Inventors: Hans Baumann; Hermann Kaack, both of Wachenheim, Fed. Rep. of Germany

[73] Assignee: BASF Aktiengesellschaft, Ludwigshafen, Fed. Rep. of Germany

[21] Appl. No.: 172

[22] Filed: Jan. 2, 1979

[30] Foreign Application Priority Data

Jan. 3, 1978 [DE] Fed. Rep. of Germany ..... 28001470

[51] Int. Cl.$^3$ .............................................. C09B 62/08
[52] U.S. Cl. ........................................................ 534/631
[58] Field of Search ........................................... 260/153

[56] References Cited

U.S. PATENT DOCUMENTS

| 2,399,066 | 4/1946 | Schmid et al. | 260/153 |
| 2,459,435 | 1/1949 | Keller et al. | 260/153 |
| 2,945,021 | 7/1960 | Fasciati et al. | 260/153 |

FOREIGN PATENT DOCUMENTS

| 1007904 | 5/1957 | Fed. Rep. of Germany | 260/153 |
| 1946196 | 5/1970 | Fed. Rep. of Germany | 260/153 |
| 2611550 | 9/1976 | Fed. Rep. of Germany | 260/153 |
| 42-15011 | 8/1967 | Japan | 260/153 |
| 1461125 | 1/1977 | United Kingdom | 260/153 |

Primary Examiner—Charles F. Warren
Attorney, Agent, or Firm—Oblon, Fisher, Spivak, McClelland & Maier

[57] ABSTRACT

Reactive dyes which in the form of the free acids correspond to the general formula

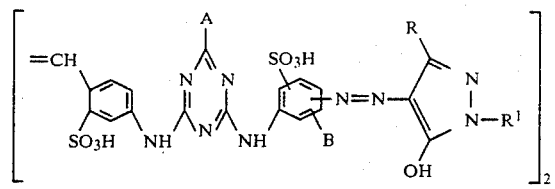

where
A is fluorine, chlorine or bromine,
B is hydrogen, chlorine, methyl, methoxy, ethoxy, hydroxysulfonyl or carboxyl,
R is carboxyl, $C_1$–$C_4$-alkoxycarbonyl, carbamyl, N-mono- or N,N-di-$C_1$–$C_4$-alkyl- or -hydroxyalkyl-substituted carbamyl, carbopiperidide, carbopyrrolidide or carbomorpholide and
$R^1$ is $C_1$–$C_4$-alkyl which is unsubstituted or substituted by cyano, hydroxyl or carboxyl, phenyl which is unsubstituted or substituted by methyl, ethyl, fluorine, chlorine, bromine, amino, trifluoromethyl, methoxy, ethoxy, cyano, phenoxy, acetyl, methylsulfonyl, benzoyl, phenylsulfonyl, acetylamino, nitro, hydroxyl, carboxyl, carbamyl, 2-benzthiazolyl or sulfamyl, or naphthyl which is unsubstituted or substituted by hydroxysulfonyl. The novel compounds are particularly suitable for dyeing cellulose-containing textile materials, polyamides and leather.

4 Claims, No Drawings

REACTIVE BIS-TRIAZINYL STILBENE DYES

SUMMARY OF THE INVENTION

The present invention relates to dyes in free acid or salt form which in the form of the free acids correspond to the general formula I

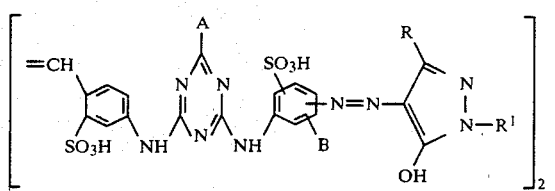

where

A is fluorine, chlorine or bromine,

B is hydrogen, chlorine, methyl, methoxy, ethoxy, hydroxysulfonyl or carboxyl,

R is carboxyl, $C_1$-$C_4$-alkoxycarbonyl, carbamyl, N-mono- or N,N-di-$C_1$-$C_4$-alkyl- or -hydroxyalkyl-substituted carbamyl, carbopiperidide, carbopyrrolidide or carbomorpholide and $R^1$ is $C_1$-$C_4$-alkyl which is unsubstituted or substituted by cyano, hydroxyl or carboxyl, phenyl which is unsubstituted or substituted by methyl, ethyl, fluorine, chlorine, bromine, amino, trifluoromethyl, methoxy, ethoxy, cyano, phenoxy, acetyl, methylsulfonyl, benzoyl, phenylsulfonyl, acetylamino, nitro, hydroxyl, carboxyl, carbamyl, 2-benzthiazolyl or sulfamyl, or naphthyl which is unsubstituted or substituted by hydroxysulfonyl.

Specific examples of radicals R, in addition to those already mentioned, are $COOCH_3$, $COOC_2H_5$, $COOC_3H_7(n)$, $COOC_3H_7(i)$, $COOC_4H_9(n)$, $COOC_4H_9(i)$, $CONHCH_3$, $CONHC_2H_5$, $CONHC_3H_7$, $CONHC_4H_9$, $CON(CH_3)_2$, $CON(C_2H_5)_2$, $CON(C_3H_7)_2$, $CON(C_4H_9)_2$, $CONHC_2H_4OH$ and $CONHC_3H_6OH$.

Examples of radicals $R^1$, in addition to those already mentioned, are: $CH_3$, $C_2H_5$, $C_3H_7$, $C_4H_9$, $CH_2CH_2CN$, $C_2H_4OH$, $CH_2COOH$ and $C_2H_4COOH$.

A compound of the formula I can advantageously be prepared by condensing a compound of the formula:

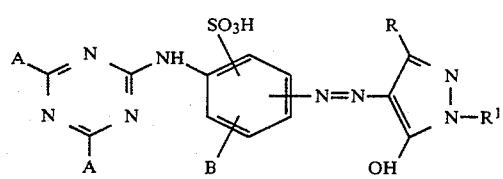

with a compound of the formula III

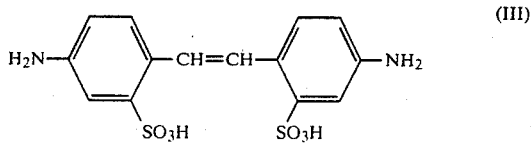

Alternatively, a compound of the formula:

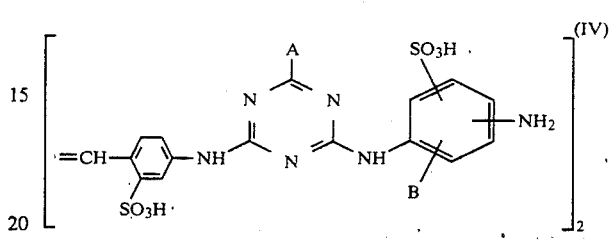

is diazotized and the product is coupled with a compound of the formula

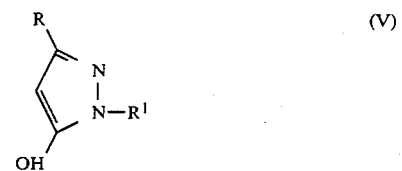

In another method, a compound of the formula:

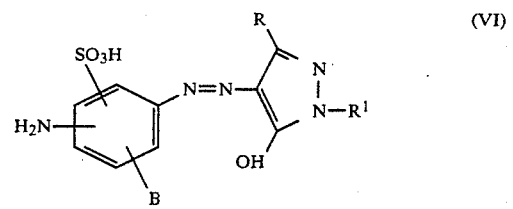

is first synthesized and condensed with a cyanuric acid derivative and then with a diaminostilbenedisulfonic acid, or is condensed with the condensation product of these two components.

The reactions in principle follow conventional reactions described in the literature and exhibit no peculiarities compared to the latter. Details of the reactions may be found in the Examples, where parts and percentages are by weight, unless stated otherwise.

The dyes of the formula I, being reactive dyes, may be used for dyeing or printing natural, regenerated or synthetic fibers, eg. wool, silk, nylon or cotton, but especially for dyeing cellulose-containing material. The exhaustion method, carried out at an elevated temperature, is preferred. The dyeings obtained are very fast; the high tinctorial strength of the compounds of the invention also deserves mention.

Compounds of particular importance are those of the formula Ia

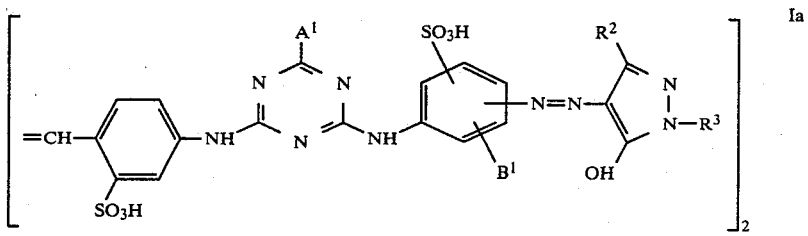

where
A¹ is fluorine or chlorine,
B¹ is hydrogen, chlorine, methyl or hydroxysulfonyl,
R² is methyl or carboxyl and
R³ is hydrogen, phenyl which is unsubstituted or substituted by fluorine, chlorine, bromine, methyl, ethyl, trifluoromethyl, methoxy, ethoxy, carboxyl, carbamyl or sulfamyl, or naphthyl which is unsubstituted or substituted by hydroxysulfonyl.

Preferably, B¹ is hydrogen or hydroxysulfonyl, R² is methyl or carboxyl and R³ is hydrogen or phenyl which is unsubstituted or substituted by chlorine, methyl or carboxyl.

EXAMPLE 1

A suspension of 37.9 parts of cyanuric chloride in 400 parts of ice water is added to 37 parts of flavonic acid dissolved in 400 parts of ice water plus sufficient sodium hydroxide to give a neutral solution. After adding 16 parts of sodium acetate, the pH of the suspension is brought to 4 by means of 4 parts of sodium bicarbonate and the temperature is kept at 0°–2° C. for about 1.5 hours. When the reaction has ended, 36.7 parts of 1,3-phenylenediamine-4-sulfonic acid are added. The solution is heated to 30° C. and stirred at this temperature for about 3 hours, whilst keeping the pH only slightly acid by adding sodium hydroxide. When no further 1,3-phenylenediamine-4-sulfonic acid is detectable, the solution is cooled to 0° C. by means of 500 parts of ice. After dissolving 13.8 parts of sodium nitrite in the mixture and adding 120 parts of hydrochloric acid (d=1.09), the mixture is stirred for 2 hours at 0°–3° C. After destroying excess nitrous acid with 1 part of amidosulfonic acid, a neutral aqueous solution of 54.6 parts of 1-(2,5-dichlorophenyl)-3-carboxypyrazol-5-one is added. The mixture is kept at 5° C. and the pH is raised to 7.5 in 1.5 hours by the addition of dilute sodium hydroxide solution. The precipitation of the dye is filtered off and dried under reduced pressure at 60° C. 186 parts of a yellow powder, which dyes cellulose fibers by the exhaustion process, at elevated temperatures, in very fast greenish yellow hues are obtained.

The dye is also very suitable for use by pad procedures and the 24 hour cold-batch process.

Dyes having similar properties are obtained if instead of 1-(2,5-dichlorophenyl)-3-carboxy-pyrazol-5-one, 1-(2-chlorophenyl)-, 1-(2,4-dichlorophenyl)-, 1-(2,6-dichlorophenyl)-, 1-(2,4,5-trichlorophenyl)-, 1-(2,4,6-trichlorophenyl)-, 1-(2-chloro-6-methylphenyl)-, 1-(2-ethylphenyl)-, 1-(2,6-diethylphenyl)-, 1-(2,6-dimethylphenyl)-, 1-(2-methoxyphenyl)-, 1-(2-ethoxyphenyl)-, 1-(2-chloro-4- or -5-methylphenyl)-, 1-(2-carboxyphenyl)- or 1-(2,4-dichloro-6-carboxyphenyl)-3-carboxypyrazol-5-one is used.

EXAMPLE 2

A neutral solution of 56.4 parts of 1,3-phenylenediamine-4-sulfonic acid in 1,000 parts of ice water is added to a suspension of 57.3 parts of cyanuric chloride in 800 parts of ice water. The pH of the suspension is kept neutral with sodium hydroxide solution and the temperature is kept at 0° C. When the condensation is complete, 150 parts of hydrochloric acid (d=1.09) and 20.7 parts of sodium nitrite in 90 parts of water are added. The suspension is stirred for 2 hours at 0°–3° C. in the presence of the excess nitrite, after which the latter is destroyed with 1 part of amidosulfonic acid. A solution of 29.5 parts of 3-methyl-5-pyrazolone in 200 parts of aqueous hydrochloric acid is then added and the pH is brought to 7–8 to bring about the coupling reaction. 55.5 parts of 4,4'-diaminostilbene-2,2'-disulfonic acid are added to the dye suspension obtained and the mixture is heated to 50° C. The pH is kept at 7 for 4 hours by means of dilute sodium hydroxide solution. The reaction is complete after stirring for a further 12 hours at room temperature. The precipitation of the dye is completed by adding sodium chloride. After filtering off and drying under reduced pressure at 70° C., 333 parts of a yellow powder are obtained; on cellulose-containing fibers, wool and silk this product, applied by various dyeing methods, gives deep greenish yellow dyeings of good fastness.

The dye can also be isolated by spray-drying its suspension after synthesis, or by freeze-drying the filter cake.

EXAMPLE 3

20.7 parts of sodium nitrite and 150 parts of hydrochloric acid (d=1.09) are added, whilst stirring, to a suspension of the condensation product of 56.4 parts of 1,3-phenylenediamine-4-sulfonic acid and 55.5 parts of cyanuric chloride in 1,200 parts of ice water. The suspension is stirred for 1½ hours at 0°–5° C. and excess nitrous acid is destroyed with 1.5 parts of urea. A neutral solution of 74.5 parts of 1-(2-carboxyphenyl)-3-carboxypyrazol-5-one in 400 parts of water is then added and the mixture is neutralized with dilute sodium hydroxide solution. After completion of coupling, 55.5 parts of 4,4'-diaminostilbene-2,2'-disulfonic acid, dissolved in 800 parts of water, are added to the suspension. The mixture is stirred for 2 hours at 40° C. and at a neutral pH, obtained by adding sodium carbonate. Toward the end of the reaction, the dye partially precipitates. The suspension is spray-dried. 480 parts of a yellow powder are obtained; this product dyes natural or regenerated cellulose fiber materials in deep neutral yellow hues which are very fast. The dye also gives dyeings of good fastness on wool, silk and nylon.

EXAMPLE 4

A neutral solution of 65.4 parts of 4-nitroaniline-2-sulfonic acid in 1,000 parts of water is prepared. After adding ice and 21 parts of sodium nitrite, the suspension is poured into a mixture of 180 parts of hydrochloric acid (d=1.09) and 400 parts of ice. The suspension is stirred for 2 hours at 0°-5° C. and the residual free nitrous acid is then destroyed with 2 parts of amidosulfonic acid. A solution of 38.4 parts of 3-carboxy-pyrazol-5-one in 800 parts of water, rendered alkaline with sodium carbonate, is then added slowly. Thereafter, 62.4 parts of 60 percent strength aqueous sodium sulfide solution are added to the well-stirred dye suspension. After completion of the reduction, the solution is stirred for some time with 90 parts of 50 percent strength hydrogen peroxide. It is then cooled to 0° C. with ice, 56.1 parts of cyanuric chloride are added and the pH of the mixture is kept at 4-5 with dilute sodium hydroxide solution. The acylation is complete after 1½ hours; the solution is then diluted, clarified by filtration, and mixed with 55.5 parts of 4,4'-diaminostilbene-2,2'-disulfonic acid. The resulting suspension is stirred for 3 hours at 30° C. and pH 7, maintained by adding sodium bicarbonate, after which the dye is filtered off. The filter cake is dried at 65° C. under reduced pressure. 180 parts of an orange brown powder, which dyes cellulosic material in deep yellowish orange hues of good fastness, are obtained.

EXAMPLE 5

A neutral aqueous solution of 26.8 parts of 1,4-phenylenediamine-2,5-disulfonic acid, cooled to 5° C., is added to an ice-cold aqueous suspension of 18.5 parts of cyanuric chloride. The mixture is stirred at 0°-5° C. and the pH is kept slightly acid by means of dilute sodium hydroxide solution until the condensation is complete. 7 parts of sodium nitrite and 60 parts of hydrochloric acid (d=1.09) are added and the mixture is stirred for one hour at 0°-5° C. Excess nitrite is destroyed by amidosulfonic acid. A solution of 20.4 parts of 1-phenyl-3-carboxy-pyrazol-5-one in 250 parts of water, rendered alkaline with sodium carbonate, is added to the nitrite-free diazo solution. After completion of coupling, 18.5 parts of 4,4'-diaminostilbene-2,2'-disulfonic acid are added and the mixture is condensed for 5 hours at 50° C. and pH 7. The dye is isolated by spray-drying the mixture. An orange powder is obtained which dyes natural or regenerated cotton in golden yellow hues of good fastness.

Further dyes according to the invention, of the formula Ib

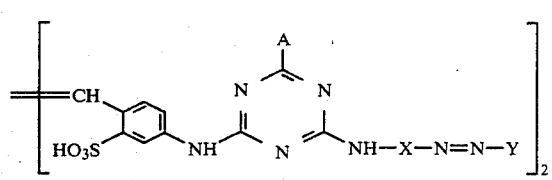

Ib and their hues on cellulosic material are shown in the Table which follows.

(The lower figure indicates the position of the link to the NH bridge).

| No. | A | X | HY | Hue |
|---|---|---|---|---|
| 6 | Cl | 1,3-(4-sulfo)-phenylene | 1-(2-methylphenyl)-3-carboxy-pyrazol-5-one | greenish yellow |
| 7 | Cl | 1,3-(4-sulfo)-phenylene | 1-(4-sulfamylphenyl)-3-methyl-pyrazol-5-one | greenish yellow |
| 8 | Cl | 1,3-(4-sulfo)-phenylene | 1-(4-carboxyphenyl)-3-methyl-pyrazol-5-one | greenish yellow |
| 9 | F | 1,3-(4-sulfo)-phenylene | 1-(2-chlorophenyl)-3-carboxy-pyrazol-5-one | greenish yellow |
| 10 | F | 1,3-(4-sulfo)-phenylene | 1-(2,4,5-trichlorophenyl)-3-carboxy-pyrazol-5-one | greenish yellow |
| 11 | Cl | 1,3-(4-sulfo)-phenylene | 1-phenyl-3-carbamyl-pyrazol-5-one | reddish yellow |
| 12 | Cl | 1,3-(4-sulfo)-phenylene | 3-carboxy-pyrazol-5-one | yellow |
| 13 | F | 1,3-(4-sulfo)-phenylene | 1-phenyl-3-carboxy-pyrazol-5-one | " |
| 14 | Cl | 1,3-(4-sulfo)-phenylene | 1-β-hydroxyethyl-3-methyl-pyrazol-5-one | " |
| 15 | Cl | 1,3-(4-sulfo)-phenylene | 1-β-carboxyethyl-3-carboxy-pyrazol-5-one | " |
| 16 | Cl | 1,3-(4-sulfo)-phenylene | 1-(4-carboxyphenyl)-3-carboxy-pyrazol-5-one | " |
| 17 | Cl | 1,3-(4-sulfo)-phenylene | 1-(3-nitrophenyl)-3-carboxy-pyrazol-5-one | " |
| 18 | Cl | 4-chloro-5-sulfo-1,3-phenylene | 3-methyl-pyrazol-5-one | " |
| 19 | Cl | 4-chloro-5-sulfo-1,3-phenylene | 1-(2,5-dichlorophenyl)-3-carboxy-pyrazol-5-one | " |
| 20 | F | 4-chloro-5-sulfo-1,3-phenylene | 1-(2,5-dichlorophenyl)-3-carboxy-pyrazol-5-one | " |
| 21 | Cl | 4-chloro-5-culfo-1,3-phenylene | 1-(6-suflonaphthyl-1)-3-methyl-pyrazol-5-one | " |
| 22 | F | 4-chloro-5-sulfo-1,3-phenylene | 1-(4,8-disulfonaphthyl-2)-3-methyl-pyrazol-5-one | " |
| 23 | Cl | 1,3-(4,6-disulfo)-phenylene | 1-phenyl-3-ethoxy-carbonyl-pyrazol-5-one | " |
| 24 | Cl | 1,3-(4,6-disulfo)-phenylene | 1-(2,4-dichlophenyl)-3-carboxy-pyrazol-5-one | " |
| 25 | Cl | 1,3-(4,6-disulfo)-phenylene | 3-carboxy-pyrazol-5-one | " |
| 26 | Cl | 1,3-(4,6-disulfo)-phenylene | 1-phenyl-3-carbo-morpholido-pyrazol-5-one | " |
| 27 | Cl | 1-methyl-5-sulfo-2,4-phenylene | 1-(2,5-dichlorophenyl)-3-carboxy-pyrazol-5-one | " |
| 28 | Cl | 1-methyl-(4-sulfo)-2,6-phenylene | 1-(2-chloro-4-methylphenyl)-3-carboxy-pyrazol-5-one | " |
| 29 | Cl | 1-methyl-(4-sulfo)-2,6-phenylene | 3-carboxy-pyrazol-5-one | " |
| 30 | Br | 1-methyl-(4-sulfo)-2,6-phenylene | " | " |
| 31 | F | 1-methyl-(4-sulfo)-2,6-phenylene | 1-(2,4,6-trichlorophenyl)-3-carboxy-pyrazol-5-one | " |
| 32 | Cl | 1-methyl-(4-sulfo)-2,6-phenylene | 1-(4,8-disulfonaphthyl-2)-3-methyl-pyrazol-5-one | " |
| 33 | Cl | 1,4-(3-sulfo)-phenylene | 3-methyl-pyrazol-5-one | golden yellow |
| 34 | " | 1,4-(3-sulfo)-phenylene | 1-(2-carboxyphenyl)-3-carboxy-pyrazol-5-one | golden yellow |
| 35 | " | 1,4-(3-sulfo)-phenylene | 1-β-cyanoethyl-3-methyl-pyrazol-5-one | golden yellow |
| 36 | F | 1,4-(3-sulfo)-phenylene | 1-(3,5-dichlorophenyl)-3-carboxy-pyrazol-5-one | yellowish orange |
| 37 | Cl | 1,4-(3-sulfo)-phenylene | 1-(3,4-dichlorophenyl)-3-methyl-pyrazol-5-one | golden yellow |
| 38 | Cl | 1,4-(2,5-disulfo)-phenylene | 3-methyl-pyrazol-5-one | reddish yellow |
| 39 | " | 1,4-(2,5-disulfo)-phenylene | 1-phenyl-3-(1-hydroxy-ethyl)-aminocarbonyl-pyrazol-5-one | orange |
| 40 | Cl | 1,4-(2,5-disulfo)-phenylene | 1-phenyl-3-n-butyl-aminocaronyl-pyrazol-5-one | orange |
| 41 | " | 1,4-(2,5-disulfo)-phenylene | 1-(3-carboxyphenyl)-3-carboxy-pyrazol-5-one | golden yellow |
| 42 | Br | 1,4-(2,5-disulfo)-phenylene | 1-(2,4,6-trichlorophenyl)-3-carboxy-pyrazol-5-one | golden yellow |
| 43 | F | 1,4-(2,5-disulfo)-phenylene | 1-β-hydroxyethyl-3-carboxy-pyrazol-5-one | golden yellow |
| 44 | F | 1,4-(2,5-disulfo)- | 1-(3-sulfamylphenyl)-3- | reddish |

| No. | A | X | HY | Hue |
|-----|---|---|-----|-----|
|     |   | phenylene | methyl-pyrazol-5-one | yellow |

EXAMPLE 45

13.8 parts of sodium nitrite and 110 parts of 5N hydrochloric acid are added, whilst stirring, to a suspension of the condensation product of 37.8 parts of 1,3-phenylenediamine-4-sulfonic acid and 37.9 parts of cyanuric chloride in 800 parts of ice water.

Upon completion of diazotization, 0.5 part of amidosulfonic acid and then a neutral solution of 47 parts of 1-(2-methoxyphenyl)-3-carboxypyrazol-5-one in 250 parts of water are added. Coupling is completed with dilute sodium hydroxide solution in the weakly alkaline range, 37 parts of 4,4'-diaminostilbene-2,2'-disulfonic acid are added to the yellow dye suspension and the mixture is stirred at 50° C. and a neutral pH until the reaction is complete. The dye is precipitated with sodium chloride and filtered off. The filter cake is dried at 70° C. under reduced pressure. 216 parts of a yellow powder are obtained which dyes cellulosic material by the exhaust method at elevated temperature intense greenish yellow hues having good fastness to wet treatments.

Similar dyes are obtained by using 1-(2-ethoxyphenyl)-, 1-(2-methoxy-5-chlorophenyl)-, 1-(2-chloro-5-trifluoromethylphenyl)- or 1-(2-ethylphenyl)-3-carboxypyrazol-5-one for coupling instead of 1-(2-methoxyphenyl)-3-carboxypyrazol-5-one.

Other dyes according to the invention of the formula

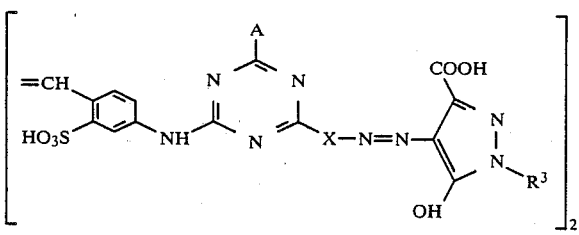

and their hues on cellulosic material are listed in the table below.

| No. | A | X | $R^3$ | Hue |
|-----|---|---|-------|-----|
| 46 | Cl | -NH-C6H3(SO3H)(CH3)- | 2-CF3-phenyl | greenish yellow |
| 47 | " | " | 2-CH3-4-NHCOCH3-phenyl | greenish yellow |
| 48 | " | " | 2-CH3-4-OCH3-phenyl | greenish yellow |
| 49 | " | -NH-C6H3(SO3H)(CH3)- | 2-OCH3-phenyl | golden yellow |
| 50 | Cl | " | 2-OC2H5-phenyl | golden yellow |
| 51 | F | " | 2-C2H5-phenyl | golden yellow |
| 52 | Cl | -NH-C6H2(SO3H)2(CH3)- | 2-OCH3-5-OCH3-phenyl | yellow |
| 53 | " | " | 2-Cl-4-CF3-phenyl | yellow |

We claim:
1. A reactive dye in free acid or salt form which in the form of the free acid corresponds to the general formula:

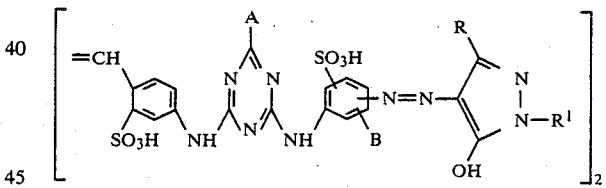

where

A is fluorine or chlorine,

B is hydrogen, chlorine, methyl, methoxy, ethoxy, hydroxysulfonyl or carboxyl,

R is carboxyl, $C_1$–$C_4$-alkoxycarbonyl, carbamyl, N-mono- or N,N-di-$C_1$–$C_4$-alkyl- or -hydroxyalkyl-substituted carbamyl, carbopiperidide, carbopyrrolidide or carbomorpholide and $R^1$ is $C_1$–$C_4$-alkyl which is unsubstituted or substituted by cyano, hydroxyl or carboxyl, phenyl which is unsubstituted or substituted by methyl, ethyl, fluorine, chlorine, bromine, amino, trifluoromethyl, methoxy, ethoxy, cyano, phenoxy, acetyl, methylsulfonyl, benzoyl, phenylsulfonyl, acetylamino, nitro, hydroxyl, carboxyl, carbamyl, 2-benzthiazolyl or sulfamyl, or naphthyl which is unsubstituted or substituted by hydroxysulfonyl.

2. A dye as claimed in claim 1, of the formula $R^6$ is hydrogen, methyl or chlorine.

4. A dye as claimed in claim 1, of the formula

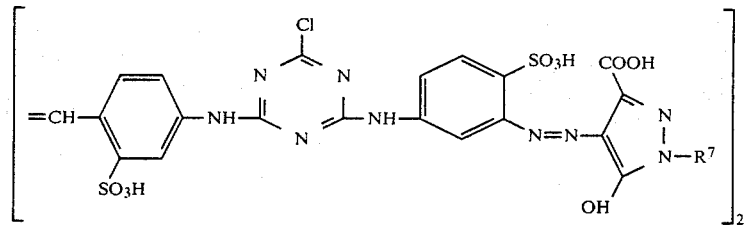

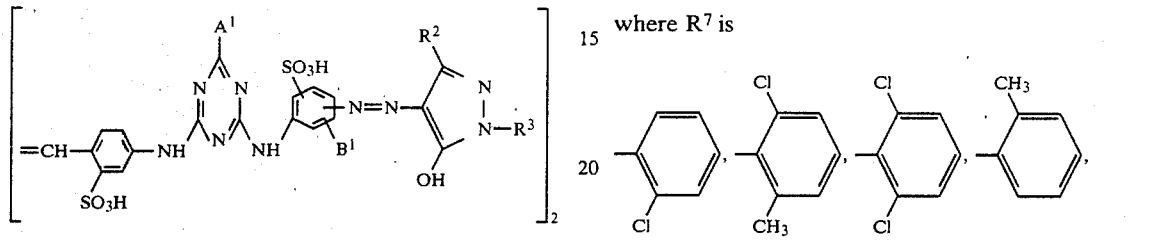

where $R^7$ is

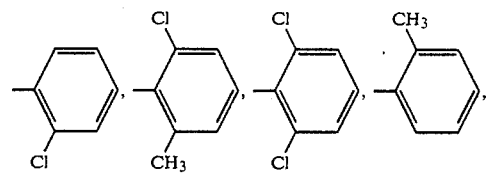

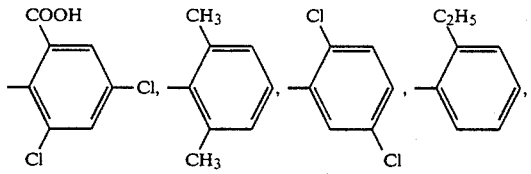

where
- $A^1$ is fluorine or chlorine,
- $B^1$ is hydrogen, chlorine, methyl or hydroxysulfonyl,
- $R^2$ is carboxyl, and
- $R^3$ is phenyl which is unsubstituted or substituted by fluorine, chlorine, bromine, methyl, ethyl, trifluoromethyl, methoxy, ethoxy, carboxyl, carbamyl or sulfamyl, or naphthyl which is unsubstituted or substituted by hydroxysulfonyl.

3. A dye as claimed in claim 1, of the formula

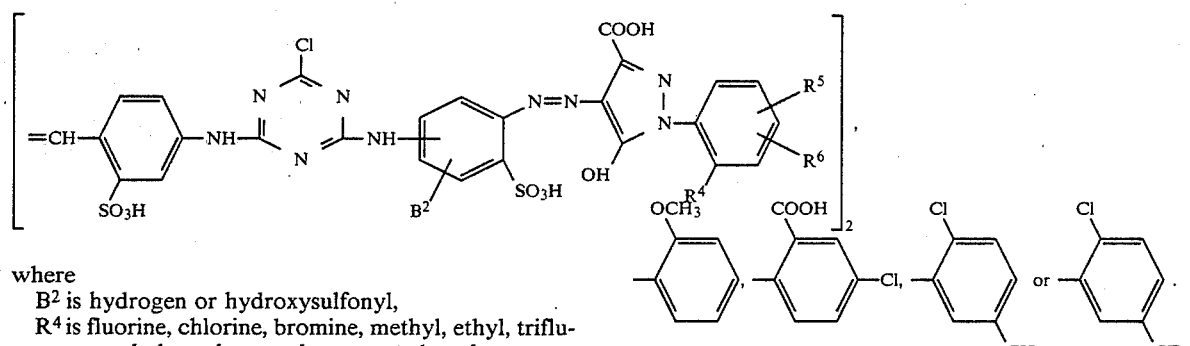

where
- $B^2$ is hydrogen or hydroxysulfonyl,
- $R^4$ is fluorine, chlorine, bromine, methyl, ethyl, trifluoromethyl, methoxy, ethoxy or carboxyl,
- $R^5$ is hydrogen, chlorine, bromine, methyl, ethyl, methoxy or ethoxy and

* * * * *